United States Patent [19]

Smith et al.

[11] Patent Number: 5,417,546
[45] Date of Patent: May 23, 1995

[54] ELBOW GUIDE TUBE ASSEMBLY

[75] Inventors: John M. Smith, Southbridge; Robert A. Brunell, Webster, both of Mass.

[73] Assignee: Schott Fiber Optics, Southbridge, Mass.

[21] Appl. No.: 111,823

[22] Filed: Aug. 6, 1993

[51] Int. Cl.⁶ .................. G02B 23/24; F01D 25/00
[52] U.S. Cl. .................. 415/118; 60/39.33; 356/241
[58] Field of Search ............ 415/118, 201; 60/39.33; 356/241

[56] References Cited

U.S. PATENT DOCUMENTS

| | | | |
|---|---|---|---|
| 3,690,775 | 9/1972 | Cousins | 356/241 |
| 3,778,170 | 12/1973 | Howell et al. | 356/241 |
| 3,936,217 | 2/1976 | Travaglini et al. | 415/118 |
| 4,011,017 | 3/1977 | Feuerstein et al. | 415/118 |
| 4,273,111 | 6/1981 | Tsukaya | 356/241 |
| 4,730,979 | 3/1988 | Hook, Jr. | 415/118 |
| 4,784,463 | 11/1988 | Miyazaki | 356/241 |

Primary Examiner—Edward K. Look
Assistant Examiner—Michael S. Lee
Attorney, Agent, or Firm—Millen, White, Zelano & Branigan

[57] ABSTRACT

In accordance with an embodiment of this invention, a combination is provided of a tubular elbow tube and mounting bracket which attaches directly on to the engine to a receiving end component at an entry port opening into the engine. The attachment of the bracket to the engine orients the elbow tube at a precise and reliable direction, thus forming a pathway through which the flexible probe is precisely guided to the desired interior location with minimal manipulation. Attachment of the bracket to a receiving component on the engine permits entry of the probe close to the entry port opening. Thus, the flexible probe requires a minimal amount of contortion or bend to reach the interior destination.

8 Claims, 2 Drawing Sheets

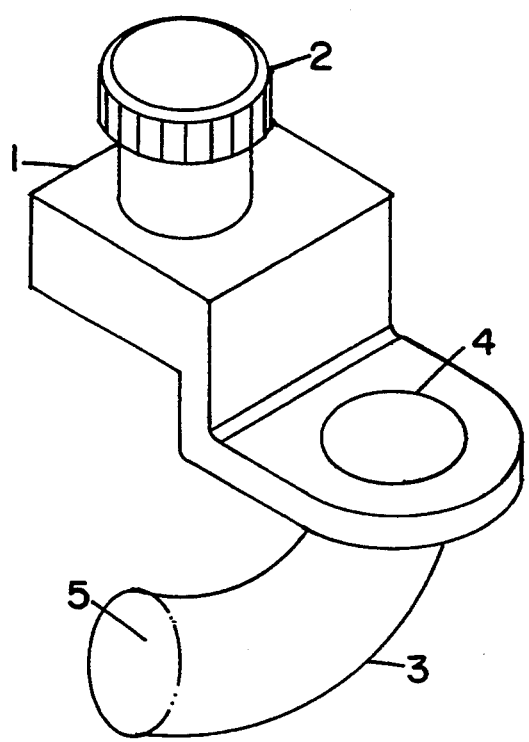
FIG. IA

ELBOW GUIDE TUBE ASSEMBLY

BACKGROUND OF THE INVENTION

Endoscopes have a variety of useful applications in industry for penetrating and viewing locations which are not otherwise directly accessible. For example, to inspect the inside of a mounted jet engine without disassembling it, an endoscope may be inserted through an entry port into the engine, thereby permitting the viewer to look inside. The ability to inspect the inside of an engine is an especially important way of assessing damage, structural integrity, repair status, and general operability.

The endoscope is generally inserted through an external opening in the structure to be inspected, such as a bleed or ignitor port for a jet engine. However, the precise interior location to be inspected may not always be directly reached from the external port. For example, there may be obstacles, gaps, and turns along the pathway to the interior location which obstruct and prohibit penetration of the endoscope probe. To overcome this problem, typically a rigid, preformed guide tube has been inserted into the external opening for guiding the flexible endoscope, past obstacles and gaps, to the general area which is to be inspected. However for the endoscope to reach the precise inspection location, extensive and laborious manipulation of the tube and endoscope is still required. The guide tubes in the prior art do not provide a way of positioning the endoscope so that it enters the engine at a precise and fixed orientation with minimal amount of bend and subsequent manipulation by the technician.

SUMMARY OF THE INVENTION

An object of the invention is to facilitate the visual inspection of an article to be inspected, e.g., an engine, with a endoscope or other flexible, elongated probe.

It is another object of this invention to provide a structure which will orient and guide an endoscope or other flexible, elongated probe into an otherwise impenetrable interior location for the purpose of visual inspection. In accordance with an embodiment of this invention, a combination is provided of a tubular elbow tube and mounting bracket which attaches directly on to the engine to a receiving end component at an entry port opening into the engine. The attachment of the bracket to the engine orients the elbow tube at a precise and reliable direction, thus forming a pathway through which the flexible probe is precisely guided to the desired interior location with minimal manipulation. Attachment of the bracket to a receiving component on the engine permits entry of the probe close to the entry port opening. Thus, the flexible probe requires a minimal amount of contortion or bend to reach the interior destination. Inspection is, therefore, quickly and readily accomplished. Ease in inspection and time-saving are especially important in commercial applications where the status of an engine must be assessed quickly. The mountable elbow guide tube assembly also protects the flexible probe from damage as it is extended through the engine to the location to be inspected.

Upon further study of the specification and appended claims, further objects and advantages of this invention will become apparent to those skilled in the art.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 1A is a perspective drawing of an embodiment of the elbow guide tube assembly.

DETAILED DESCRIPTION OF THE INVENTION

Figure 1B:
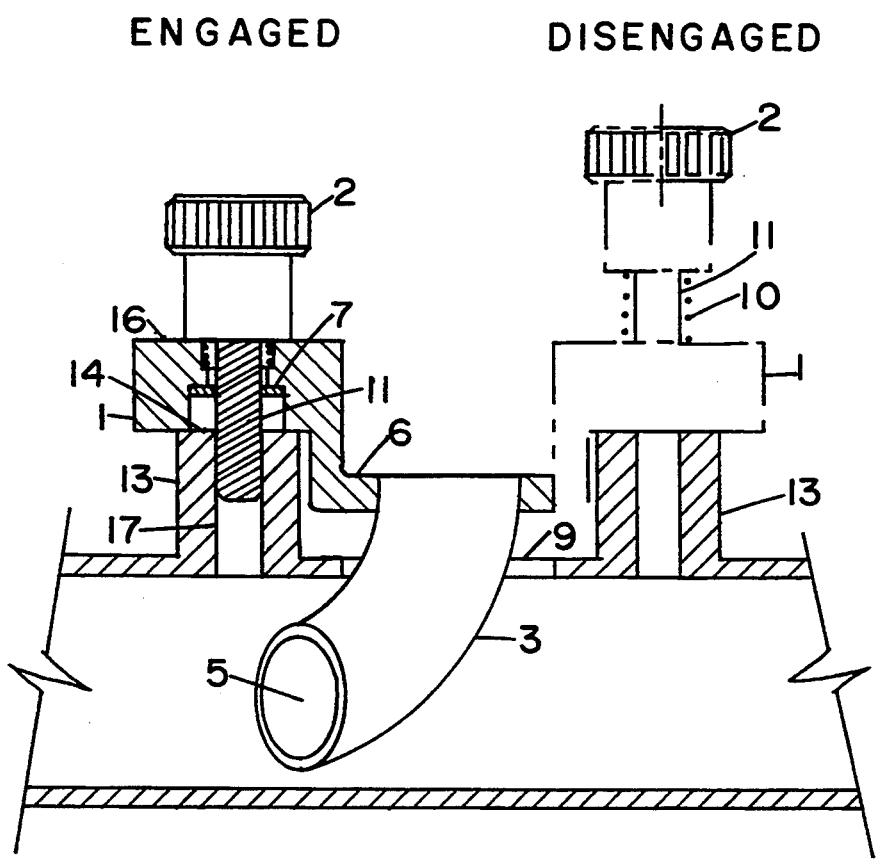
FIG. 1B is an elevation view of the same embodiment of the elbow guide tube assembly.

FIGS. 1A and 1B show an embodiment of a mountable elbow guide tube assembly having a mounting means and an elbow guide tube section. The mounting means is for attaching the elbow guide tube section to the engine at a receiving component. The receiving component is typically a structure of the engine, e.g., as the receiving component 13 in FIG. 1B. For example, a receiving component may be an access port having female boss(es). These boss(es) and other such structures are herein referred to as receiving components. The receiving component 13 can have a top surface 14 raised with respect to the entry port opening 9 and for receiving the mounting means.

As shown in the embodiment illustrated here, the mounting means comprises a bracket 1 and a single or plurality of fasteners, i.e., knurled thumb screw 2. When the mounting means is connected to the receiving component 13, the elbow section 3 can project into the entry port opening 9. According to the mounting means illustrated in FIG. 1, a bracket 1 and a knurled thumb screws 2 are designed so that they fit a receiving component 13 adjacent to an entry port opening 9 of an engine. The receiving component can be a female boss. When the bracket 1 is attached to the receiving component by a screw(s) 2, the elbow section 3 points in at precise angle, the angle which is selected to guide the flexible probe to the interior location to be inspected.

The bracket 1 comprises a lower exposed surface 6 and an upper surface(s) 16, respectively. The entrance end 4 for entering the endoscope or other flexible probe is positioned at the lower exposed surface 6. The lower exposed surface 6 of the bracket 1 is designed so that it fits between the receiving components 13, close to the entry port opening 9 into the interior of the engine. In FIG. 1B, the bracket 1 is shown having a lower surface 6 which, when attached to the engine, is included between the raised receiving ends 13, thereby permitting the entrance end 4 of the guide tube section to be close to the entrance of the entry port opening of the engine. The advantage of the bracket 1 configuration is that it requires less bend or contortion in the endoscope or other flexible probe as it is inserted through the entrance end 4 of the guide tube assembly into the engine interior as compared to a bracket whose entrance end 4 is further away from the entry port opening 9 of the engine. The bracket 1, therefore, provides the endoscope with a low point of entry into the engine. As a result, less bending and contortion of the endoscope is required, making it easier to manipulate and guide to its destination in the engine interior. The inspection process is, therefore, faster and more reliable since less skill is required to find the inspection area.

An object of the invention is, therefore, a guide tube assembly comprising a mounting means having a lower exposed surface and an elbow section having an entrance end connected to the lower exposed surface of the mounting means, wherein the lower exposed surface is close to the entry port opening of the engine. It is especially advantageous when a receiving component is raised off the surface of an entry port opening to an engine and an entrance end of an elbow section is below the top surface of the receiving component. For example, in the embodiment illustrated here, the entrance end 4 of the elbow section 3 of a guide tube section is nestled or recessed between the receiving components 13 and beneath the top surface 14 of the receiving component end 13. Consequently, when the assembly is attached to the engine via the receiving end 13, the entrance end 4 of the elbow section 3 is positioned below a top surface of the end 13, close to the entry port opening 9. The bracket configuration, therefore, permits the endoscope to enter into the engine close to the entry port opening 9 while the elbow is securely attached to the engine. The operator can, therefore, manipulate the endoscope close to the point where it actually enters the interior of the engine.

The bracket 1 configuration shown in FIGS. 1A and 1B are illustrative for a Garrett 731 series engine. The receiving component 13 is a female bore or boss having a tapped hole through the center thereof. Entry into the female boss is from the top surface 14. The bracket may be manufactured from, e.g., stainless steel or other material as conventional in the art. While the bracket shown here is suitable for inspection through an access port, it is evident that other entry ports may require brackets or other means having different dimensions. An object of the invention is, therefore, a bracket or other structure having an entrance end, e.g., entrance end 4, which is close to the entrance or opening of the article whose interior is to be inspected, minimizing the amount of bending required to position and guide the flexible probe to its interior destination. The low point of entry provided by the bracket for the endoscope or other flexible probe is illustrated in the embodiment as shown in FIGS. 1A and 1B but it is apparent that its advantages are applicable to other situations.

To position and attach the elbow guide tube assembly to the engine, the exit end 5 of the elbow tube 3 is inserted into the entry port of the engine. The knurled thumb screw(s) 2 on the upper surface 16 of the bracket 1 are aligned over the receiving component 13 adjacent to the entry port opening 9 of the engine. By pressing and twisting the thumb screw 2 down, the screw is engaged and screwed into the threaded female bore of the receiving end 13. As a result, the elbow section is securely attached to the engine and positioned to guide the flexible probe to the desired interior location with minimal manipulation.

The tubular elbow section 3 has an entrance end 4 for entering a flexible probe and an exit end 5 for exiting the probe. When the mounting bracket 1 is attached to the receiving end of the entry port, the exit end 5 of the elbow section 3 will point in a direction which facilitates penetration of the probe to the desired interior location. Therefore, the curvature and angle at which the elbow section 3 points is determined by the point of attachment of the mountable elbow guide tube assembly to the engine and the interior location of the space which is to be inspected. For example, for inspecting a 731 series engine manufactured by Garrett General Aviation Division of Allied Signal Aerospace Company, the elbow points at 52°. In general, the elbow section is shaped for guiding the probe in an effective orientation through the entry port into the interior of the engine; i.e., an effective orientation is one which permits the flexible probe to reach the interior location which is to be inspected with minimal amount of manipulation and/or contortion by the worker.

The elbow section 3 must be large enough for an endoscope or other flexible probe to pass through but small enough to fit through a port, e.g., the access port of an engine. Therefore, the outer and inner diameters of the elbow section 3 is controlled by the size and circumstances of the article to be inspected. For fitting into the access port of a 731 Garrett engine, typically the outer diameter of the tubular elbow is 0.5 inches and the inner diameter is 0.45 inches. Its length is 1.5 inches. The material from which the elbow is manufactured is as conventionally used, typically selected for durability and strength, e.g., stainless steel.

The elbow section 3 is attached at its entrance end 4 to the mounting bracket 1. Attachment is accomplished conventionally, e.g., by brazing, soldering, or welding. The mounting bracket 1 is a mounting means to attach the elbow section 3 to the article to be inspected. By attaching the lower surface of the mounting means to the elbow section, the elbow section is oriented precisely, as determined in advance, therefore, facilitating the movement of the probe to the interior location to be inspected. The choice of the mounting means is determined by the article to which it is attached on the engine. For example, an access port of a 731 series Garrett engine, has a receiving end component 13. The bracket 1 and screw(s) 2 are selected to fit over one or more threaded receiving components. The screw(s) 2 are selected so that the shank 11 is complementary to the threaded passage. However, other dimensions and arrangements may be used, depending on the article to be inspected and its dimensions, e.g., to position and secure the elbow section 3 and provide a low point of entry for the probe into the engine. The bracket may also be adjustable. The bracket 1 may be manufactured from the same material as the elbow section, e.g., stainless steel, or other conventional materials.

FIG. 1B shows a cross sectional view of a means as in FIG. 1A for attaching the mountable elbow guide assembly to the receiving end of an entry port opening of an engine. The mountable elbow assembly is mounted and secured to the engine via the receiving component 13. The elbow section projects into the engine through the entry port opening 9 of the engine.

In accordance with FIG. 1B, a means for attaching the elbow section to the engine is shown. A knurled screw 2 is shown in both the engaged (locked) or disengaged (unlocked) positions. A compression spring 10 is captivated proximally to the underside of the knurled screw 2 and distally to an outer flange of the pathway through which the knurled screw shank 11 passes. When the compression spring 10 is not compressed, the thumb screw 2 is disengaged; when the spring 10 is compressed, the screw 1 is engaged. By pressing down on the knurled screw 2 and twisting it, the spring 10 is compressed and the screw shank 11 is threaded into the receiving component 13 of the engine, locking the assembly into place. This locking arrangement ensures that the elbow section is correctly positioned. By attaching a compression spring 10 proximally to the underside of the screw 2 and distally to a flange 7 inside the bracket, the screw 2 is held in the disengaged position. The screw shank 11, the compression spring 10, and the length of the bracket 1 from its top to bottom are selected so that the screw shank is does not protrude from the underside of the bracket when it is in the disengaged position. Therefore, the screw shank 11 is not exposed and does not dangle freely when the guide tube assembly is being mounted to an engine, thereby facilitating the ease at which the guide tube can be mounted.

In practice, it will be necessary to inspect the interior of an engine which is still attached to the article to be inspected, e.g., an airplane, or an engine before it is attached to the article. For example, inspection through an access port of a 731 Garrett series engine is readily accomplished using the guide tube assembly according to FIGS. 1A and 1B. The elbow section 3 is inserted into the entry port opening 9. The knurled screw(s) 2 are positioned over the threaded pathway 14 of the receiving end 13. The screw 2 is pressed and twisted, screwing into the threaded pathway 17, thereby locking the assembly in the engaged position. The assembly is now securely attached to the access port. The flexible probe, e.g., a fiberscope, is inserted through the entrance 4 of the elbow section 3. The amount of bend required to accomplish the insertion is less as compared to the situation where the entrance end 4 is aligned with the top surface 14 of the raised receiving end. Therefore, less effort and manipulation is required to reach the desired interior space which is to be visualized using the flexible probe.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents, and publications, cited herein, are hereby incorporated by reference.

What is claimed is:

1. A mountable elbow guide tube assembly for inspection of an engine using a flexible probe comprising,
    (a) a tubular elbow section having an entrance end for inserting the probe and an exit end for exiting the probe, the elbow section being shaped for guiding the probe in an effective orientation through an entry port opening of an engine;
    (b) a mounting means for attaching the tubular elbow section to a receiving component of the engine adjacent to the entry port opening thereof, the receiving component having a top surface raised with respect to the entry port opening and for receiving the mounting means, the mounting means having at least one upper surface for attaching to the receiving component and a lower exposed surface connected to the entrance end of the elbow section, the connection being formed so that the elbow section projects into the entry port opening when the mounting means is attached to the receiving component and a probe can be inserted into the entrance end and exited from the exit end, the lower exposed surface of the mounting means being located below the top surface of the receiving component.

2. The mountable elbow guide tube assembly according to claim 1, wherein the mounting means comprises a bracket having a first upper surface, a second upper surface, and a lower exposed surface, the lower exposed surface being recessed between the first and second upper surfaces, and a fastener located on upper surface(s) for attaching to the receiving component.

3. The mountable elbow guide tube assembly according to claim 2, wherein the mounting means further comprises a compression spring attached proximally to the fastener and distally to the bracket, the attachment being made so that the spring is compressed when the thumb screw is engaged and the spring is decompressed when the thumb screw is disengaged.

4. The mountable elbow guide tube assembly according to claim 2, wherein the mounting means attaches to an access port of a Garrett 731 series engine.

5. The mountable elbow guide tube assembly according to claim 1, wherein the receiving component is an access port of a Garrett 731 series engine.

6. The mountable elbow guide tube assembly according to claim 1, further comprising a probe which is an endoscope.

7. A mountable elbow guide tube assembly for inspection of an engine comprising:
    (a) a tubular elbow section having an entrance end for inserting a probe and an exit end for exiting the probe, the elbow section being shaped for guiding the probe in an effective orientation through an access port opening of a Garrett 731 series engine;
    (b) a bracket for attaching the tubular elbow section to a receiving component of the engine adjacent to the access port opening thereof, the receiving component having a top surface raised with respect to the entry port opening and for receiving the bracket, the bracket having at least one surface of upper surface(s), and a lower exposed surface, the lower exposed surface being recessed below said at least one surface, the lower exposed surface being connected to the entrance end of the elbow section, the connection being formed so that the elbow section projects into the entry port opening when the mounting means is attached to the receiving component and a probe can be inserted into the entrance end and exited from the exit end, the lower surface of the bracket being located below the top surface of the receiving component.

8. The mountable elbow guide tube assembly according to claim 7, further comprising a probe which is an endoscope.

* * * * *